(12) United States Patent
Honnick

(10) Patent No.: US 6,669,835 B1
(45) Date of Patent: *Dec. 30, 2003

(54) AQUEOUS DISPERSIONS OF POLYMERIZABLE REACTANTS AND A WATER INCOMPATIBLE CATALYST SORBED ON AN INORGANIC PARTICULATE CARRIER

(75) Inventor: William D. Honnick, Exton, PA (US)

(73) Assignee: ATOFINA Chemicals, Inc., Philadelphia, PA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/995,887

(22) Filed: Dec. 22, 1997

Related U.S. Application Data
(60) Provisional application No. 60/038,622, filed on Feb. 18, 1997.

(51) Int. Cl.[7] .............................................. C25D 13/06
(52) U.S. Cl. ...................... 205/317; 204/471; 204/489; 524/839; 524/901
(58) Field of Search ................ 204/489, 509, 204/450, 471; 428/457; 502/151, 159, 155, 162; 505/152; 427/239; 205/317; 524/839, 840, 901

(56) References Cited

U.S. PATENT DOCUMENTS

| | | |
|---|---|---|
| 3,114,722 A | 12/1963 | Einhorn et al. .............. 260/2.5 |
| 3,136,731 A | 6/1964 | Piechota et al. ............. 260/2.5 |
| 3,245,946 A | 4/1966 | O'Connor et al. ............. 260/41 |
| 3,280,489 A | 10/1966 | Bergmann .................. 40/27.5 |
| 3,341,488 A | 9/1967 | O'Connor ..................... 260/37 |
| 4,017,438 A | 4/1977 | Jerabek et al. ............. 260/29.2 |
| 4,031,050 A | 6/1977 | Jerabek ....................... 260/29.2 |
| 4,061,724 A * | 12/1977 | Grose .......................... 423/335 |
| 4,341,689 A * | 7/1982 | Doshi .......................... 523/211 |
| 4,507,410 A | 3/1985 | Falardeau et al. ........... 523/211 |
| 4,518,718 A | 5/1985 | Frost ........................... 521/122 |
| 4,954,472 A | 9/1990 | Scott et al. .................. 502/152 |
| 5,116,914 A | 5/1992 | Chung et al. ................ 525/528 |
| 5,168,084 A * | 12/1992 | Pellet ............................. 502/9 |
| 5,177,117 A | 1/1993 | Coe et al. .................... 521/117 |
| 5,178,748 A * | 1/1993 | Casci ........................... 208/46 |
| 5,218,211 A | 6/1993 | Cresswell et al. .......... 250/571 |
| 5,258,071 A * | 11/1993 | LaRoche ..................... 106/447 |
| 5,356,529 A | 10/1994 | Eswarakrishnan et al. .. 205/224 |
| 5,672,432 A * | 9/1997 | Harris et al. ............. 428/425.8 |
| 5,674,567 A * | 10/1997 | Kausch ..................... 427/385.5 |
| 5,718,817 A * | 2/1998 | Bossert ....................... 204/501 |

FOREIGN PATENT DOCUMENTS

| | | |
|---|---|---|
| EP | 0264834 | 4/1988 |
| EP | 0 396 092 | 11/1990 |
| GB | 899098 | 6/1962 |
| GB | 927004 | 5/1963 |

* cited by examiner

*Primary Examiner*—Roy King
*Assistant Examiner*—William T. Leader
(74) *Attorney, Agent, or Firm*—P. De Benedictis; R. Eichelburg

(57) ABSTRACT

Aqueous compositions containing polymerizable components and a water incompatible catalyst for the polymerization reaction sorbed onto an inorganic particulate carrier, polymers produced thereby and articles coated with said polymers are provided. The invention also relates to water incompatible catalyst sorbed onto on an inorganic particulate carrier for aqueous coatings and the coatings produced by reactions catalyzed with the water incompatible catalyst sorbed onto an inorganic particulate carrier in an aqueous matrix.

12 Claims, No Drawings

AQUEOUS DISPERSIONS OF POLYMERIZABLE REACTANTS AND A WATER INCOMPATIBLE CATALYST SORBED ON AN INORGANIC PARTICULATE CARRIER

This application claims priority from Provisional Application Serial No. 60/038,622, filed Feb. 18, 1997.

BACKGROUND OF THE INVENTION

1. Field of the Invention

The invention is directed to aqueous compositions containing polymerizable components and a catalyst for the polymerization reaction sorbed onto a particulate carrier, polymers produced thereby and articles coated with said polymers. The invention also relates to water incompatible catalyst sorbed onto on an inorganic particulate carrier for aqueous coatings.

2. Description of Related Art

Catalysts are commonly used in the polymerization and crosslinking reactions of monomeric or resinous materials to form polymers. The catalysts, polymerizable components, and other additives may be in the form of coatings, particles, articles, solutions, or dispersions. The compositions may be manipulated and polymerized as "neat" compositions, i.e. in the absence of solvents or carriers, as organic solutions or as water dispersed or emulsified compositions. Each composition has it's own strengths and weaknesses.

The chemistry of the polymerizable components is the primary factor determining the type of catalyst to use, the matrix in which the reactants are manipulated is most often the determinant factor relative to the physical form of the preferred catalyst. This is especially true for water dispersed or emulsified reactants. With organic solvent systems, the catalyst is almost always readily soluble in the solvent matrix and becomes active with the application of some applied energy source, such as heat or UV. There are few problems associated with such systems as long as the chosen catalyst is soluble in the solvent matrix or polymerizable components and catalyzes the curing reaction. Insoluble but dispersible powder catalysts can be used as long as they are uniformly dispersed in the matrix, water or organic solvent, and activated only by an applied energy source. In the instance where water is used as the matrix for the dispersion or emulsification of reactants, several unique problems exist relative to the catalyst employed. When an active catalyst is incorporated into a water dispersion or emulsion, it may begin to catalyze the curing reaction prematurely. Further, the catalyst itself may adversely affect the dispersion or emulsion stability resulting in precipitation or coagulation of the organic phase. Finally, in the case of coatings, catalyst "incompatibility" may cause undesirable surface defects in the cured coating.

Many catalysts, in particular those which are soluble in the matrix, initiate catalysis of the curing reaction prematurely. Thus, the so called "pot life" or "shelf life" of the system is shortened. This means that the polymer is formed too soon and in the case of coatings, for example, may cause a number of problems such as poor adhesion of the coating to the coating substrate, poor chemical resistance, or unacceptable physical properties including pinholes, rugosity, craters, etc.

Many attempts have been made to overcome the problems of premature catalysis by developing so called "delayed action" or "latent" catalyst systems. In these systems, the catalyst is frequently absorbed into a carrier which alone or after some further treatment, acts to "bind" the catalyst and prevents it from promoting premature reaction. In these systems, some mechanism for causing the release of the catalyst from the carrier is required. For example, British Patent 899,098 teaches porous aluminum silicate having absorbed therein a curing catalyst. The polymer system is a silicone rubber. The catalyst may be dibutyltin dilaurate. As stated on page 2, lines 70 to 74. "This absorption in a molecular sieve effectively deactivates the catalyst." Also note on page 3, lines 4 to 10 "Polar liquids, for example water, alcohol, nitrites, or similar materials may be stirred into the silicone rubber mixture and will expel the cross linking agent/and or curing catalyst from the aluminum silicate, so as so bring about vulcanization of the mixture at room temperature." The teaching of this patent is to inactivate the catalyst by sorption onto a molecular sieve and release the catalyst with water or other polar liquid to initiate catalysis. In contrast, the present invention utilizes carriers and catalyst combinations that are stable in water.

U.S. Pat. No. 3,114,722 concerns polyurethane foam, and absorbing a water soluble amine catalyst onto shredded urethane foam to achieve delayed catalysis.

U.S. Pat. No. 3,136,731 describes a method of preparing a polyurethane with a delayed action catalyst, by sorbing the catalyst on an organic support having a density of about 0.01 to about 0.6 $Kg/cm^3$. (See column 2, lines 7–12). The organic support is described in column 2, lines 26 to 44 as polymeric particulate materials. Organotins can be used as a catalyst—see column 6, lines 48 to 73. Polyurethane coatings are described at column 7, line 21, but apparently not water dispersed urethane coating systems. Accordingly, the teaching of the '731 patent is directed to coatings compositions which are dispersed in organic solvents, not aqueous dispersions.

U.S. Pat. No. 3,245,946 describes the use of zeolites in rubber compounding, e.g., absorbing pyrocatechol on a crystalline zeolite molecular sieve for use as a latent catalyst.

U.S. Pat. No. 3,280,0489 relates to delayed catalysis and heat activation for production of urethane foam with the major emphasis on water generating components.

U.S. Pat. No. 3,341,488 teaches the absorbing of a material into a molecular sieve and employing low molecular weight materials, such as water, to displace the catalyst from the carrier at a predetermined time under the influence of heat so that the catalyst can become active.

Published European Patent Application 0,264,834 relates to the use of polymeric micro particles on or in which catalysts (including tin catalyst) are sorbed for use in urethane coating systems, notably electrodeposited coatings including those based on blocked isocyanates. The objective of the sorbed catalyst is to achieve improved dispersion. However inorganic particulate material did not work adequately. A pigment paste, which included lead silicate and Kaolin (which is an aluminum silicate having absorptive capacity) was employed in comparative example 6. The results of testing the coatings show that comparative example #6 has poor hardness, poor chemical resistance and poor salt spray resistance, as compared to example #7. This shows that the inorganic particulates of themselves have poor curing activity. In comparison, the combination provided by the present invention of catalyst sorbed onto an inorganic carrier is effective and economical.

U.S. Pat. No. 5,177,117 describes controlled (delayed) release catalysts for production of polyurethane (foam) by using water as a blowing agent and to release the catalyst from a molecular sieve carrier. U.S. Pat. No. 3,136,731 describes the preparation of a delayed action catalyst for polyurethanes by sorbing the catalyst onto an organic support, preferably a porous bead with a density between 0.01 and 0.6 kg/cm$^3$. The use of "delayed action" catalysts may be undesirable resulting in slower cure reactions and, in the case of coatings, poor coating quality. Furthermore, the "delayed action" catalysts which depend on water to release the catalyst from the absorbent carrier would be practically useless in a system where water is the matrix.

U.S. Pat. No. 5,218,111 describes dimerization catalyst, not coatings. It uses a sorbed phosphine catalyst.

U.S. Pat. No. 5,258,071 describes non-aqueous paint system containing vitreous particulates, e.g., glass beads to which have been affixed a bonding agent, e.g., a silane and a catalyst bonded to the glass surface through the bonding agent.

Jerabek U.S. Pat. No. 4,031,050, Jerabek et al., U.S. Pat. No. 4,017,438 and Bosso et. al. describe aqueous coating compositions based on blocked organic polyisocyanates, an amine adduct of an epoxy group-containing resin and a diorganotin catalyst. These compositions are cationic and may be electrodeposited on a cathode and are widely employed as primers for automotive substrates. In this process, a conductive article such as an auto body or an auto part is immersed in a bath of the aqueous coating and acts as an electrode in the electrodeposition process. An electric current is passed between the article and a counter-electrode in electrical contact with the aqueous coating until a desired coating thickness is deposited on the article. These coatings will be referred to herein as "E-coatings." The present invention is particularly suited to "E-coatings."

Chung et. al. U.S. Pat. No. 5,116,914 notes that dibutyltin oxide, which is used as a catalyst in these aqueous coatings, is difficult to disperse whereas dibutyltin dilaurate can be hydrolyzed which causes cratering problems in the deposited film. The patentees describe the use of a dibutyltin diacetyl acetonate catalyst to avoid these problems.

There are a number of problems attributed to the incompatibility of catalysts in aqueous media that have severely limited the usefulness of many catalysts. Frequently, the incorporation of catalysts into the aqueous compositions have adverse effects on the stability of dispersions or emulsions, ranging from immediate destabilization in which the organic components precipitate out to the formation of undesirable "gel" particles over time. In the instance where catalysts are insoluble solids, they are frequently difficult to disperse into the aqueous matrix. If the dispersion is insufficient, then the coating may have an uneven cure or defects, such as craters, may occur in the cured coating. Incompatibility of both insoluble solid and insoluble liquid catalysts may also have an adverse effect on storage stability, giving rise to a variety of defects in the coating, including pinholes, craters, pock marks, or an irregular surface resembling an orange peel.

The use of polymeric micro particles on or in which catalysts are sorbed are described in European Patent Application 0,264,834 as an method for achieving uniform dispersions without adversely affecting the characteristics of the cured coating. The preparation of such catalyst compositions, though add a considerable amount of processing and cost compared to processes involving the sorbing of liquid catalysts onto inorganic particulate carriers.

The need therefore exists, for an economical catalyst system and a method which can be used in water dispersed or emulsified polymerizable components without the shortcomings and limitations associated with existing catalyst systems.

SUMMARY OF THE INVENTION

The invention provides a Water Incompatible Catalyst (as defined herein) sorbed onto a water dispersible inorganic particulate carrier for use in aqueous systems. Also provided is a stable, aqueous, dispersion containing or resulting from ingredients comprising polymerizable reactants and an inorganic particulate carrier having sorbed thereon a Water Incompatible Catalyst for the polymerization reaction. The invention is based on the discovery that a water incompatible catalyst such as hydrophobic or water insoluble catalysts, although incompatible with aqueous compositions, can be made dispersible in water by first being sorbed onto an inorganic particulate carrier that is dispersible in water. The particle size of the carrier should be in a range for achieving dispersion of the particles in water. An electrocoating process using the aqueous compositions is also provided as is the article produced thereby. A blocked isocyanate and a polyol are suitable polymerizable reactants. Water insoluble catalysts that are liquid when sorbed onto the inorganic particle carrier are the preferred Water Incompatible Catalysts.

DETAILED DESCRIPTION

The invention relates to catalysts for use in aqueous matrix systems and which promote the cure of polymers from reactants dispersed in the matrix and which are incompatible with an aqueous matrix but rendered compatible and dispersible in an aqueous matrix by first sorbing the catalyst on a suitable inorganic particulate carrier such as fumed silica and then dispersing the particulate carrier in the aqueous matrix. Combinations of catalysts sorbed onto the particulate carrier are also included in the scope of the invention, especially two, three or four catalyst combinations with at least one of the catalyst being a water incompatible catalyst.

The term "aqueous matrix" as used herein refers to a mixture in which water is the major component and contains other active ingredients dispersed, emulsified and/or dissolved therein to form a waterborne composition containing the active ingredients. Latex paint and "E" coat compositions are examples of compositions having an aqueous matrix.

Catalysts

"Water Incompatible Catalyst" as the term is used herein means a catalyst that is incompatible with an aqueous matrix such as a catalyst that is essentially water insoluble (i.e., solubility less than 1% by weight in water at 25° C. based upon the weight of metal in the catalyst), or are hydrophobic or that destabilize the aqueous matrix as evidenced by phase separation or an adverse effect on "pot life", polymer formation, water dispersion of reactants, or emulsion stability resulting in precipitation or coagulation of the organic phase or causing undesirable surface defects in the cured coating. Tests for adverse effects on pot life, polymer formation, water dispersion or emulsion stability are explained and demonstrated in the examples disclosed herein.

The catalyst in the aqueous matrix is employed in a catalytically effective amount usually from about 0.01 wt % to about 5 wt % and especially from about 0.05 wt % to about 2 wt % based on the weight of metal in the catalyst and based on total weight of polymerizable solids.

Catalysts suitable for use in the present invention are Water Incompatible Catalysts that catalyze the polymer forming reaction of the dispersed reactants upon drying. The catalyst must also be capable of being sorbed on the particulate carrier. To be sorbed, the catalyst should be a liquid at the temperature at which sorption is being carried out. For example some solid catalysts can be liquefied by being dissolved in a suitable organic solvent or heated above ambient temperature and sorbed on or into the carrier while liquid. If a solvent is used to liquefy the catalyst, the solvent is preferably evaporated before the particulate carrier and catalyst are dispersed in the aqueous composition.

Typical catalysts useful for curing reactions of polymerizable components comprise metal compounds that may be selected from a broad range of metals in the periodic chart, including metals from all groups of the periodic table except groups VIA, VIIA, and the inert gases. Examples are disclosed in U.S. Pat. Nos. 3,136,731 and 4,865,704, which includes both water compatible and Water Incompatible catalysts. Organotin catalysts and mixtures of organotin catalysts with other catalysts are disclosed in U.S. Pat. Nos. 4,256,621, 4,395,528, 4,904,361, 5,221,701, 5,330,839, 5,356,529, and European Patent 264,834, and references therein which are incorporated herein by reference. Among such known catalysts, those catalysts that are Water Incompatible Catalyst as defined herein are suitable for use in the present invention. All water soluble catalysts, i.e., a catalyst having a water solubility sufficient to achieve a catalytically effective concentration in water for curing the reactive components in the aqueous emulsion upon drying are not "Water Incompatible Catalysts" as defined herein. However water soluble catalysts can be used in combination with Water Incompatible Catalysts in the present invention. Liquid, water insoluble catalysts are Water Incompatible Catalysts.

Examples of preferred Water Incompatible Catalysts are water insoluble and based on the reaction product of manganese, cobalt, nickel, copper, zinc, germanium, antimony, aluminum, or bismuth, or the oxides, carbonates, or alkoxides thereof with a mercaptan, or an organic acid, wherein said organic acid is hexanoic, neodecanoic, lauric, palmitic, oleic, stearic, phthalic, oxalic, adipic, lactic, tartaric, salicylic, thioglycolic, succinic, or mercapto succinic acid, or the reaction product of copper or germanium, or the oxides thereof with a lower aliphatic acid, and a monorgano tin, diorgano tin, or triorganotin compound for promoting the reaction of said polyisocyanate with said polyfunctional compound and, wherein the inorganic particulate carrier is selected from the group consisting of fumed silica, precipitated silica, alumina, alumino silicates, alumino phosphates, zeolites, diatomaceous earth, titania, zirconia, magnesia, aluminum silicate, aluminum phosphate, talcs, and graphite. Specific examples of Water Incompatible Catalysts are: dibutyltin dilaurate, dibutyltin dioleate, dimethyltin dilaurate, dimethyltin distearate, trioctyltin oxide, trioctyltin acetate, bis-trioctyltin phthalate, monobutyltin tris(2-ethylhaxoate), monomethyltin tris(2-ethylhexanoate), zinc octoate, zinc palmitate, zinc oleate, zinc tallate, zinc stearate, bismuth 2-ethylhexanoate, bismuth laurate, bismuth neodecanoate, bismuth oleate, bismuth tallate, and bismuth stearate. Particularly suitable are liquid or solid organotin catalysts such as dibutyltin dilaurate, monobutyltin tris(2-ethyl hexanoate), trioctyltin oxide, and trioctyltin acetate.

It is also within the scope of the invention to "sorb" more than one Water Incompatible Catalyst on the inorganic particulates or to use combinations of the sorbed catalyst(s) with a water compatible catalyst to achieve co-catalysis or synergistic catalysis where beneficial.

Inorganic Particulate Carrier

The Water Incompatible Catalyst when "sorbed" on an inorganic particulate becomes dispersable in the aqueous matrix. The particulate should be any inorganic material that is dispersible in the aqueous matrix and non reactive with the matrix and polymerizable reactants dispersed therein. The inorganic particulate material may provide additional functions in the cured polymer e.g. pigmentation, flame retardancy, gloss reduction, or corrosion resistance. Suitable inorganic particulate carriers onto which the catalyst may be sorbed include silica, such as fumed silica or precipitated silica, alumina, alumino silicates, alumino phosphates, zeolites such as kaolin, diatomaceous earth, titania, zirconia, magnesia, aluminum silicate, aluminum phosphate, talcs, and carbon/graphite.

Particle size for the carrier should be in a range that is suitable for achieving a stable aqueous suspension of the particulate in the coating composition. Suitable stability depends upon how the aqueous coating composition will be used and needs of the user. For example, if the coating composition is blended at the point of use by combining the ingredients into an "E Coat" bath into which items to be coated are immersed, adequate dispersion stability of several weeks may be sufficient. Even less time may be adequate if the coating bath is agitated. However if the aqueous coating composition is to be formulated and shipped to the user or stored in a warehouse, suitable dispersion stability may require the particulate carrier to remain dispersed in the coating composition for months without agitation or to be readily redispersed when agitated before use of the coating composition. Generally, particle size of less than 100 microns is adequate for the particulate carrier to achieve dispersion in an aqueous matrix with sufficient stability for the purposes of this invention. Preferred is an average particulate size in the range of 0.1 microns to 20 microns. The particulate carrier need not be in a dispersible particle size range when the catalyst is sorbed onto the particles but can be reduced to a dispersible particle size after sorption by grinding or other known means, after all or some of the catalyst has been sorbed onto the particles.

Sorption of Catalyst

The process of sorbing a liquid onto a solid carrier is well known to those skilled in the art. The process can be generally described as the mixing of a liquid with a solid. There are many different types of equipment that can be used for this purpose, some of which are described in the following references:

Kirk Othmer "Encyclopedia of Chemical Technology", 4th Ed., John Wiley, NY 1995, Vol 16 pg. 844.

"Ullmann's Encyclopedia of Industrial Chemistry", VCH, Wenheim, Ger., 1988, Vol B2

"Converting Liquids to Dry Flowable Powders", Pub. GP-73, Degussa Corporation

The particulate carrier is a free flowing solid prior to sorption of the catalyst onto it and the amount of catalyst sorbed onto the carrier is preferably less than the amount that would interfere with the carrier remaining a free flowing solid after evaporation of any solvents used to liquefy the catalyst. In other words, the particulate carrier with the sorbed catalyst should still appear to be a dry powder. The sorbtive capacity of the particulate carrier, that is the amount of Water Incompatible Catalyst that can be sorbed on a given amount of particulate carrier, is dependent on the type of particulate carrier chosen for the application and not generally related to particle size. For example some types of precipitated silicas can absorb 2 times or more of their weight in Water Incompatible Catalyst to give a free flowing powder. A weight ratio of between 0.1:1 and 2.5:1 parts of Water Incompatible Catalyst per part of particulate carrier is preferred. A ratio of between 0.5:1 and 1.5:1 is particularly preferred.

Aqueous Matrix

An aqueous matrix as used herein refers to a composition in which water is the major component and contains other active ingredients dispersed, emulsified and/or dissolved therein. These aqueous compositions are frequently referred to as waterborne coatings. Latex paint and "E" coat compositions are examples of compositions having an aqueous matrix. Due to environmental considerations, the coatings industry has been turning to systems wherein the reactants are dissolved or dispersed in an aqueous system. These systems require the formation of stable solutions or dispersions and hydrolytic stability for all reactants. For example, coatings may be deposited from aqueous dispersions onto metal surfaces by electocoating such as cathodic deposition, as described by Bosso et. al., U.S. Pat. No. 4,101,486, the teaching of which are incorporated herein by reference. Such electrocoating processes are referred to herein as "E" coat. Reactants suitable for being dispersed in an aqueous emulsion or dispersion are well known. "E" coat technology involves using water dispersible reactants and a suitable water compatible catalyst for the reactants which are dispersed in an aqueous bath. Waterborne urethane coatings compositions are another example in which water dispersible reactants and a suitable water compatible catalyst for the reactants are dispersed in water. The present invention allows the use of non-water compatible catalyst to be used in such waterborne formulations as latex paints and "E" coat compositions by sorbing the Water Incompatible Catalyst onto the particulate carrier and dispersing the resulting particulate carrier and catalyst into the water matrix. The effectiveness of the catalyst in waterborne formulations is also improved by sorbing the catalyst onto the particulate carrier. It is believed that such improvement in effectiveness and/or efficiency is due to improved dispersion of the catalyst when sorbed onto the particulate carrier. As demonstrated in the examples, a Water Incompatible Catalyst, while capable of catalyzing the reactive components in a non-aqueous vehicle such as oil based paints, destabilizes an aqueous emulsion of such reactive components or interferes with the emulsion sufficiently so that the reactive components don't produce an adequately cured film. The examples substantiate the problems that occur when a Water Incompatible Catalyst is added directly to an aqueous matrix such as an emulsion; such as destabilizing the emulsion by coagulating two or more components of the emulsion, separating the emulsion into separate phases, or agglomerating components of the emulsion so that a nonhomogeneous film results upon drying of the emulsion on a substrate to be coated as evidenced by significant pin holes in the film or surface defects in the film. For most catalyst, incompatibility with an aqueous matrix is readily apparent because incompatibility is manifested when the catalyst is added to an aqueous emulsion by the catalyst not being dispersible in the aqueous matrix or addition of the catalyst resulting in the emulsion rapidly separating into phases after addition of the catalyst. Sometimes incompatibility is less apparent as shown in the examples or as when separation into phases of an otherwise stable aqueous emulsion does not take place immediately but does takes place in a short time, e.g., only several weeks, after addition of the catalyst. This results in unacceptable shelf life for the aqueous coating composition although an acceptable film may be achieved with the coating formulation if the emulsion is used promptly after addition of the catalyst. For most catalysts, incompatibility in an aqueous matrix can be readily determined by those skilled in the art by performing a simple test of adding the catalyst to an aqueous coating composition and observing whether a separation of the organic components promptly takes place. If it does, than the catalyst is a Water Incompatible Catalyst as defined herein. Catalyst incompatibility can also be determined by making two aqueous coating emulsions with the catalyst in question, one by adding the catalyst directly into the aqueous composition in accordance with common practice for addition of catalyst and a second by first sorbing the catalyst onto inorganic particles in accordance with the teaching herein and then comparing films made with each coating composition promptly upon making the coating emulsions and also after aging the emulsions for several weeks. Comparison of films can be made using any standard technique such as the comparison techniques used in the examples contained herein. A Water Incompatible Catalyst will produce a superior film when sorbed onto the particulate carrier prior to being added to the aqueous composition verses being directly added to the aqueous composition.

Water Dispersible Reactants

Reactants that are dispersible in an aqueous matrix either as a dispersion or an emulsion are well known to those skilled in the art especially for use in latex paints or "E" coat compositions. Particularly suitable are blocked isocyanates and isothiocyanates. Typically these are mono- and polyisocyanates and mono- and polyisothiocyanates, particularly diisocyanates and diisothiocyanates. While the invention has been described specifically with reference to the reaction of certain diisocyanates, it is generally applicable to the reaction of any compound containing one or more —N=C=Y groups in which Y is oxygen or sulfur. Examples of polyisocyanates suitable for the present invention include aliphatic compounds such as trimethylene, tetramethylene, pentamethylene, hexamethylene, 1,2-propylene, 1,2-butylene, 2,3-butylene, 1,3-butylene, ethylidine and butylidene diisocyanates. Oxime and phenol blocked polyisocyanates are preferred in some instances because polyisocyanates blocked with these oximes or phenols uncap at relatively low temperatures. Bis(cyclic ureas) are blocked aliphatic diisocyanates and are preferred in some embodiments because no by-products are formed upon thermal release of the reactive isocyanate groups. These comprise compounds that can be referred to as self blocked isocyanates. Examples of these bis-cyclic ureas are described by Ulrich, ACS Symp. Ser. 172 519 (1981) Sherwood, J. Coat. Technol. 54 (689), 61 (1982) and Kirk-Othmer Encyclopedia of Chemical Technology, Third Edition, Volume 23, p. 584 all of which are incorporated herein by reference. The blocked reactive isocyanate or isothiocyanate is reacted with a functional compound containing reactive hydrogens as determined by the Zerewitinoff method described in J. Am. Chem. Soc., Vol. 49, p. 3181 (1927). These compounds containing active hydrogens comprise compounds used for manufacturing a polyisocyanate prepolymer, e.g., polyols including polyether polyols or polyester polyols which is to say compounds containing hydroxyl groups. The functional compound may also comprise a resin which is an adduct of a primary and/or secondary amine with an epoxy group-containing resin or a resin which is an adduct of an amine-acid salt with a polyepoxide. Other epoxy-containing compounds and resins that may be employed include nitrogenous diepoxides such as those disclosed in U.S. Pat. Nos. 3,365,471; 3,391,097; 3,450,711; 3,312,664; 3,503,979 and British Patent No. 1,172,916 all of which are incorporated herein by reference. An amine adduct of an epoxy group-containing resin that is employed according to the invention is further described by Jerabek, U.S. Pat. No. 4,031,050, Jerabek et al., U.S. Pat. No. 4,017,438 and the resin containing active hydrogen atoms and quaternary ammonium groups prepared by the reaction of a polyepoxide with an amine salt that is employed according to the invention is described by Bosso et al., U.S. Pat. No. 4,101,486, all of which are incorporated herein by reference.

The various specific isocyanate and thioisocyanate materials that can be employed according to the present invention as well as functional compounds containing reactive hydrogen are further described by Hostettler et al. U.S. Pat. Nos. 3,084,177; 3,240,730; 3,392,128 and 3,392,153 as well as Jerabek et al. and Bosso et al., all of which are incorporated herein by reference.

Polymerizable reactants that are emulsifiable or dispersible in a water matrix are well known to those skilled in the art and are broadly described in the following references:

Charles R. Martens, "Waterborne Coatings", VanNostrand Reinhold, NY 1981

Oil and Colour Chemist Association, Australia, "Surface Coatings", Taft Educational Books, Randwick, Australia, 1983

Zeno W. Wicks, Jr., Frank N. Jones, and S. Peter Pappas, "Organic Coatings: Science and Technology", Vol II, John Wiley, NY, pg 208–217, 1994

"Reformulating to Waterborne Coatings", Southern Society for Coatings Technology, 1996

Fritz Beck, *Progress on Organic Coatings*, 4, 1 (1976)

Specific examples are disclosed in U.S. Patents such as U.S. Pat. Nos. 4,031,050, 4,101,486, 4,256,621, 4,615,779, 4,785,068, 4,865,704, and 5,281,316 which are incorporated herein by reference.

Additional Ingredients

Other compounds may be used in combination with the Water Incompatible Catalysts of the invention, either sorbed onto the particulate carrier or added separately to the aqueous matrix. These include lithium oxide; sodium and potassium alkoxides; sodium formate, carbonate, benzoate, and borohydride; potassium and calcium acetates; alkali soaps; metal naphtheriates; N,N-dimethylformamide; and Friedel Crafts-type catalysts. Additionally, potassium salts of carboxylic acids, ammonium salts of carboxylic acids and other tertiary amines, such as 2,4,6-tris(N,N-dimethylaminomethyl)-phenol, 1,3,5-tris(3-dimethylaminopropyl)hexahydro-s-triazone, as well as ammonium salts can be used.

The following examples are illustrative of the invention and the preferred embodiments.

Tests for Water Incompatible Catalyst by Effects on Aqueous Matrix or Resulting Polymer Several simple tests for determining if a catalyst is a Water Incompatible Catalyst are disclosed above. However, a few catalyst can initially appear compatible in such tests by being dispersible in an aqueous matrix with dispersed reactants and the matrix appear stable but the incompatibility manifests itself within a few days or a few weeks. For such catalyst, incompatibility can be detected by the following observations and/or tests which detect adverse effects on the aqueous matrix or resulting polymer as compared with the same polymer catalyzed with the same catalyst but with the catalyst being sorbed on an inorganic carrier before being dispersed in the aqueous matrix. Such delayed manifestation of incompatibility is shown by: (1) instability of the aqueous matrix resulting in agglomerization or coagulation of the resin dispersions (reactants) as detected by phase separation of the aqueous matrix in several weeks, or (2) defects in the resulting polymer formed with the aqueous matrix. The test to detect and rate the effect of delayed manifestation of incompatibility of the catalyst on the aqueous matrix is performed by adding the catalyst to be tested to an aqueous coating emulsion and observing the effects and rating the effects on stability or defects in the resulting polymer as follows:

Adverse Effects on Aqueous Matrix Stability
Rating
1 No change in the aqueous matrix stirred at room temperature for 2 weeks
2 Some coagulated resin particles formed after being stirred at room temperature for 2 weeks
3 Some coagulated resin particles formed after stirring at room temperature for 24 hours.
4 Some coagulated resin particles formed after stirring at room temperature for 3 hours
5 Rapid destabilization and heavy formation of coagulated resin particles immediately after addition of the catalyst composition to the bath.

A rating higher than 2 means the catalyst being tested is a Water Incompatible Catalyst.

Adverse Effects on Resulting Polymer (Surface Defects or Poor Cure)

(A) Surface Defects

Incorporation of a Water Incompatible Catalysts directly into the aqueous matrix can produce films that have surface defects in the form of craters, pock marks, and bumps and sinks (orange peel). The following is a scale used to detect a Water Incompatible Catalysts and rate the adverse effect of the catalyst as shown by surface defects:

Rating
1 Smooth surface, no visible defects
2 Generally smooth surface; some signs of surface defects, a few isolated pinholes and pock marks, or a trace of irregular surface (i.e., orange peel).
3 Scattered surface defects
4 Defects across most of the surface
5 Severe surface defects.

Coatings with a rating of 1 or 2 are considered to have an acceptable surface appearance i.e. the catalyst is a water compatible catalyst while ratings higher than 2 mean the catalyst being tested is a Water Incompatible Catalyst.

(B) Poor Cure Test by Acetone Extraction

This is a test that is used to detect catalyst incompatibility as manifested by poor cure of the intended polymer verses using the same reactants and catalyst but first sorbing the catalyst onto a particular carrier as taught herein. The test detects adverse effects on the degree of cure of the polymer by determining the degree of cure of a coating of the polymer. The test is conducted by weighing a 10×5 cm steel panel, coating the panel with a 7×5 cm coating and curing the panel as set forth in the examples. The panels are allowed to stand for 24 hours before weighing the cured coating. The panel is immersed in refluxing acetone for 6 hours, removed, allowed to dry for 24 hours, weighed, and the percent weight loss of the coating calculated. The percent weight loss is a measure of the degree of cure, the lower the percent weight loss, the greater the degree of cure. A Water Incompatible Catalyst will have a lesser degree of cure under this test when added directly to the aqueous matrix verses being first sorbed on an inorganic particulate carrier.

EXAMPLE 1

20 g of bis(trioctyltin)oxide (TOTO), a liquid at room temperature, were slowly added to 20 g of fumed silica, Cab-O-Sil (M-5), while being agitated in a container to give a free flowing powder. 4.94 g of the sorbed catalyst was added to a mixture of 4.68 g of an unpigmented, epoxy based resin obtained from PPG Industries, Inc., (Manufacture identity code XE-73-1444) and 15 g of deionized water to give a concentrated catalyst containing paste. This mixture was then added to 824 g of unpigmented, an epoxy type resin obtained from PPG Industries, Inc., (Manufacture identity code E5993 and Trade Name "ED4 Resin"), and 985 g of deionized water to yield an aqueous matrix having dispersed therein polymer forming reactants and an inorganic particulate having sorbed thereon a Water Incompatible Catalyst (TOTO). The aqueous matrix is suitable for use as an electro depositable cationic composition (E Coat) based on the reaction of an epoxy resin, an amine, and a blocked polyisocyanate, and does not contain any pigments or fillers. Steel panels, 100×150 cm, were coated on both sides when immersed to a depth of 120 cm in the resulting bath by electrodeposition at 240 volts with initial conductivity of 1 amp for 2 minutes. The coated panels are cured for 20 minutes at temperatures from 140 to 200° C. and tested for degree of cure by the acetone extraction test. See Table 1 for results.

Comparative Example 1A 2.47 g of TOTO (the same catalyst used in example 1) were added to a mixture of 4.68 g. of an unpigmented, epoxy based resin XE-73-1444, 824 g of unpigmented E5993, and 1000 g of deionized water. Steel panels were coated and cured as described in example 1.

EXAMPLE 2

20 g of molten trioctyltin acetate (TOTA), a waxy solid that melts at 47–48° C., was slowly added to 20 g of fumed silica, Cab-O-Sil (M-5), while agitated in a container to give a free flowing powder. 5.39 g of the sorbed catalyst was added to a mixture of 4.68 g of XE-73-1444 and 15 g of deionized water to give a concentrated catalyst containing paste. This mixture was then added to 824 g of E5993 and 985 g of deionized water to yield an aqueous matrix having dispersed therein polymer forming reactants and an inorganic particulate having sorbed thereon a Water Incompatible Catalyst (TOTA). Steel panels were coated and cured as described in example 1.

Comparative Example 2A 35 g of TOTA that was ground and passed through a 40 mesh screen, was added to a mixture of 40.8 g of an epoxy based resin obtained from PPG Industries, Inc., (Manufacture identity code HEQ-8716) and 74.8 g of deionized water, to give a concentrated catalyst paste. 15 g of this concentrated catalyst paste was added to 824 g of E5993 and 1000 g of deionized water. This resulted in an aqueous matrix that appeared stable. Steel panels were coated and cured as described in example 1. The polymer produced had defects compared to the polymer produced in example 2 with the same type of reactants and catalyst as shown by tests performed on the polymers of examples 2 and 2A and reported in table 1. The results demonstrate that TOTA is a Water Incompatible Catalyst.

Comparative Example 2B 2.74 g of TOTA was dissolved into 2.74 g of 2-butoxyethanol and 4.68 g of XE-73-1444. This solution was added to 824 g of E5993 and 1000 g of deionized water. Steel panels were coated and cured as described in Example 1. The polymer produced had defects compared to the polymer produced in example 2 with the same reactants and catalyst as shown by tests performed on the polymers of examples 2 and 2B and reported in table 1. The results demonstrate that TOTA is a Water Incompatible Catalyst.

EXAMPLE 3

6.67 g of TOTO sorbed onto fumed silica, as described in example 1, was dispersed into 250 g of a pigmentated aqueous paste containing an epoxy based grind resin and pigments using a Cowle's blade at 600 rpm for 30 minutes. Then, 182.34 g of the catalyst containing paste was mixed with 740 g of an aqueous resin dispersion containing an epoxy based resin (made by reacting an epoxy resin and an amine and sufficient carboxylic acid to make it water dispersible) and blocked polyisocyanate to yield an electro depositable cationic aqueous matrix having dispersed therein inorganic particulates having sorbed TOTO sorbed thereon, polymerizable reactants comprising an epoxy resin, an amine, and a blocked polyisocyanate, 18.5 g of 2-butoxy ethanol, and 932.4 g of deionized water. Steel panels, 100×150 cm, are coated on both sides when immersed to a depth of 120 cm in the resulting bath by electrodeposition at 200 volts with initial conductivity of 1 amp for 2.25 minutes. The coated panels are cured for 17 minutes at temperatures from 149 to 210° C. and tested for degree of cure by the acetone extraction test. See Table 2 for results.

Comparative Example 3A 3.34 g of TOTO was dispersed into 250 g of the same pigmented aqueous paste used in example 3 and using the procedures described in Example 3. 179.97 g of the catalyst containing paste was mixed with 740 g of the aqueous resin dispersion used in example 3, along with 18.5 g of 2-butoxy ethanol and 932.4 g of deionized water. Steel panels were coated and cured and tested as described in example 3. The results are given in Table 2.

TABLE 1

| | | Surface Defects | | Acetone Resistance Test % Weight Loss at Cure Temperature | | | | |
| --- | --- | --- | --- | --- | --- | --- | --- | --- |
| | Matrix | | | | | | | |
| Example | Stability | Initial | 2 Weeks | 140 C. | 150 C. | 160 C. | 180 C. | 200 C. |
| 1 | 1 | 1 | 1 | 71.2 | 61.8 | 30.5 | 5.4 | +0.7 |
| 1A | <5 | 4 | | 91.9 | 78.9 | 69.5 | 39.0 | 10.9 |
| 2 | 1 | 1 | 1 | 69.6 | 55.1 | 29.1 | 2.6 | +0.2 |

TABLE 1-continued

| | | Surface Defects | | Acetone Resistance Test % Weight Loss at Cure Temperature | | | | |
|---|---|---|---|---|---|---|---|---|
| Example | Matrix Stability | Initial | 2 Weeks | 140 C. | 150 C. | 160 C. | 180 C. | 200 C. |
| 2A | <5 | 5 | | | 56.3 | | 3.0 | |
| 2B | <5 | 2 | | 73.0 | 52.2 | 31.1 | 2.4 | +0.9 |

TABLE 2

| | | Surface Defects | | Acetone Resistance Test % Weight Loss at Cure Temperature | | |
|---|---|---|---|---|---|---|
| Example | Matrix Stability | Initial | 1 Week | 2 Weeks | 140 C. | 150 C. | 160 C. |
| 3 | 1 | 2 | 1 | 1 | 29.3 | +0.6 | 2.2 |
| 3A | 1 | 2 | 5 | 5 | 34.8 | +0.7 | 2.2 |

EXAMPLE 4

25.0 grams of zinc stearate, a waxy, water insoluble solid with a melting point in the range of 120 to 1300° C., were mixed with 25.0 grams of Sipernat 50, a precipitated silica from Degussa Corporation having an average particle size of about 50 microns. The mixture was vigorously agitated and heated to above 150° C. to melt and liquefy the zinc stearate. The mixture was held above 150° C. for about 30 minutes with agitation to allow the silica to sorb the melted zinc stearate. The product was cooled to room temperature to give a free flowing solid. The sorbed catalyst in this form has been converted from a Water Incompatible Catalyst to a water compatible catalyst and can be readily dispersed in an aqueous coating emulsion and function as a catalyst therein.

Comparitive Example 4

20.0 grams of bismuth neodecanoate, a water insoluble liquid at room temperature obtained from OM Group Inc., were added slowly to 20.0 grams of Sipernat 50, a precipitated silica available from Degussa Corporation, while being agitated in a container to give a free flowing solid powder. The sorbed catalyst in this form has been converted from a Water Incompatible Catalyst to a water compatible catalyst and can be dispersed in an aqueous emulsion and function as a catalyst therein.

The aqueous compositions of the present invention may be formulated with additional ingredients such as pigments, fillers, fibers, flame retardant or other additives, gloss reducing agents, and the like.

The coating compositions of the present invention can also be applied to polymeric substrates including both thermoplastic and thermosetting polymers, especially polyolefins, phenolics, polyvinylchlorides, polyvinylidine chlorides and fluorides, polyesters, ABS polymers, acrylics, epoxys, polyamides, Teflon® and the like. Treating the polymeric surface with a composition known in the related art that provides electrical conductivity, such as a tin or carbon coating, allows the substrate to be coated electrolytically ("E" coat), otherwise latex type compositions of the present invention can be used to coat nonconductive substrates.

The coating composition can be applied according to conventional techniques including for example, by dipping, brushing, spraying, roller coating or by electrodeposition on electroconductive polymeric compositions or metallic substrates.

It will be apparent to those skilled in the art that various modifications and variations can be made to the curable aqueous matrix composition containing a Water Incompatible Catalyst sorbed on a particulate carrier as taught herein without departing from the spirit or scope of the invention.

What is claimed is:

1. An aqueous composition in which the major component is water and having dispersed in said water polymerizable reactants and an inorganic particulate carrier having a particle size less than 100 microns and having sorbed on said inorganic particulate carrier a catalyst for said polymerizable reactants and wherein said catalyst is a metal containing catalyst having a water solubility less than 1% by weight in water at 25° C. based upon the weight of metal in the catalyst and is a liquid when sorbed onto said inorganic particulate carrier.

2. The composition of claim 1 wherein said catalyst is hydrophobic.

3. The composition of claim 1 wherein the weight ratio of the catalyst to the particulate carrier is between 0.1:1 to 2.5:1.

4. The composition of claim 3 wherein said catalyst is molten and at a temperature above 25° C. when sorbed on said inorganic particulate carrier and the weight ratio of the catalyst to the particulate carrier is between 0.1:1 to 2.5:1.

5. The composition of claim 1 wherein the particulate carrier is selected from fumed silica, precipitated silica, alumina, alumino silicates, alumino phosphates, zeolites, diatomaceous earth, titania, zirconia, magnesia, aluminum silicate, phosphate, talc, or carbon.

6. The composition of claim 1 wherein said catalyst is selected from dibutyltin dilaurate, dibutyltin dioleate, dimethyltin dilaurate, dimethyltin distearate, trioctyltin oxide, trioctyltin acetate, bis-trioctyltin phthalate, monobutyltin tris(2-ethylhaxoate), monomethyltin tris(2-ethylhexanoate), zinc octoate, zinc palmitate, zinc oleate, zinc tallate, zinc stearate, bismuth 2-ethylhexanoate, bismuth laurate, bismuth neodecanoate, bismuth oleate, bismuth tallate, or bismuth stearate.

7. The composition of claim 1 wherein said catalyst is zinc octoate, zinc palmitate, zinc oleate, zinc tallate, or zinc stearate and the inorganic particulate carrier is silica particles.

8. The aqueous composition of claim 1 wherein the reactants comprise:

(i) a blocked component selected from a blocked isocyanate or a blocked isothiocyanate; and (ii) a functional compound containing active hydrogen and reactive with said blocked component; and, the particulate carrier is a silicate.

9. The composition of claim 1 wherein the reactants comprise:
   (i) a blocked polyisocyanate; and
   (ii) a functional compound reactive with said blocked polyisocyanate comprising a polyfunctional compound containing active hydrogen, and said catalyst is trioctyltin oxide.

10. The composition of claim 1 wherein the reactants comprise:
    (i) a blocked reactive component selected from a blocked isocyanate or a blocked isothiocyanate; and
    (ii) a functional compound reactive with said blocked reactive component containing active hydrogen; and
    the catalyst for promoting the reaction of the reactive component with the blocked functional compound is based on the reaction product of manganese, cobalt, nickel, copper, zinc, germanium, antimony, or bismuth, or the oxides, carbonates, or alkoxides thereof with a mercaptan, or an organic acid, wherein said organic acid is hexanoic, oxalic, adipic, lactic, tartaric, salicylic, thioglycolic, succinic, or mercapto succinic acid, or the reaction product of copper or germanium, or the oxides thereof with a lower aliphatic acid, and a monorgano tin, diorgano tin, or triorganotin compound for promoting the reaction of said isocyanate or isothiocyanate with said functional compound and, wherein the inorganic particulate carrier is selected from fumed silica, precipitated silica, alumina, alumino silicates, alumino phosphates, zeolites, diatomaceous earth, titania, zirconia, magnesia, aluminum silicate, aluminum phosphate, talcs, or graphite.

11. A process of coating a surface of an article with a polymer comprising immersing the article in the aqueous composition of claim 1, electrolytically depositing said polymerizable reactants and said inorganic particulate carrier containing said sorbed catalyst onto the surface, removing the article from the bath and curing the reactants to form a polymer coating on the article.

12. A process for coating a metal substrate comprising contacting said substrate with the aqueous composition of claim 1 and passing an electric current between the substrate and a counter-electrode in electrical contact with said aqueous composition until a desired coating thickness is deposited from said composition onto said substrate; removing the coated metal substrate from the aqueous composition; and, curing said coating.

* * * * *